United States Patent [19]
Spanke et al.

[11] 3,735,842
[45] May 29, 1973

[54] SPRING APPLIED, FLUID PRESSURE RELEASED LOCKING DEVICE

[75] Inventors: Edwin A. Spanke, Oak Forest; Vincent J. Balunas, Jr., Chicago, both of Ill.

[73] Assignee: U. S. Industries, Inc., New York, N.Y.

[22] Filed: Apr. 8, 1971

[21] Appl. No.: 132,445

[52] U.S. Cl. .................. 188/67, 188/1 A, 188/170, 248/354 R
[51] Int. Cl. ............................................. B65h 59/10
[58] Field of Search .................. 188/67, 1 A, 170, 188/65.1; 182/201; 74/531; 248/287, 354 R

[56] References Cited
UNITED STATES PATENTS

| | | | |
|---|---|---|---|
| 3,559,509 | 2/1971 | Muller | 188/170 X |
| 2,494,985 | 1/1950 | Campbell | 188/67 X |
| 3,033,325 | 5/1962 | Tjernstrom | 188/170 |
| 3,441,110 | 4/1969 | Ruggen | 188/170 |

FOREIGN PATENTS OR APPLICATIONS

| | | | |
|---|---|---|---|
| 345,442 | 3/1931 | Great Britain | 248/354 R |
| 1,928,722 | 12/1970 | Germany | 188/1 A |
| 1,247,707 | 10/1960 | France | 188/1 A |
| 902,123 | 1/1954 | Germany | 248/354 R |

*Primary Examiner*—George E. A. Halvosa
*Attorney*—Johnston, Root, O'Keeffe, Thompson & Shurtleff

[57] ABSTRACT

A locking device for preventing accidental movement of a member and embodying elongated supporting members, with a unit comprised of a plurality of plates mounted on the supporting members and movable to be disposed in clamped and released relation thereto.

6 Claims, 7 Drawing Figures

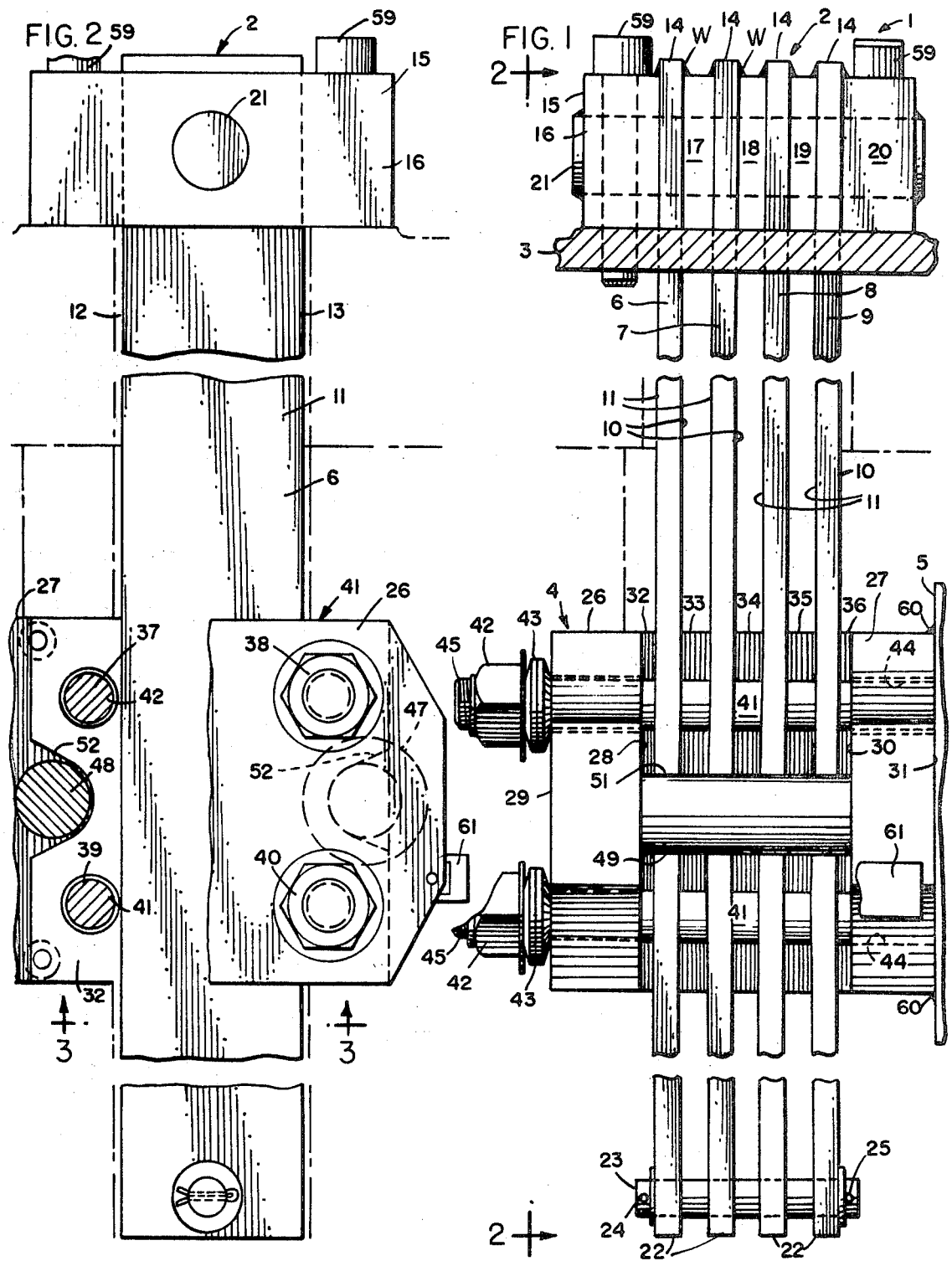

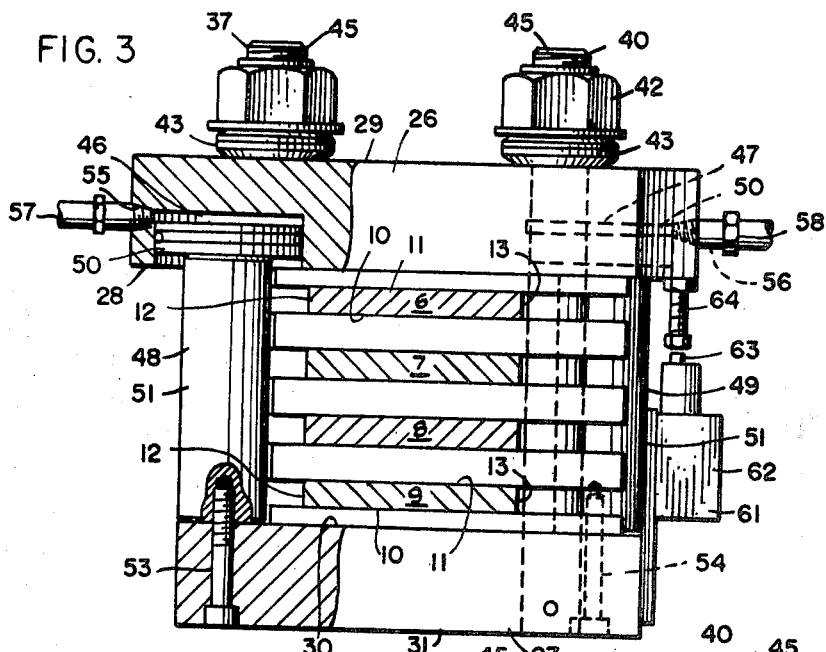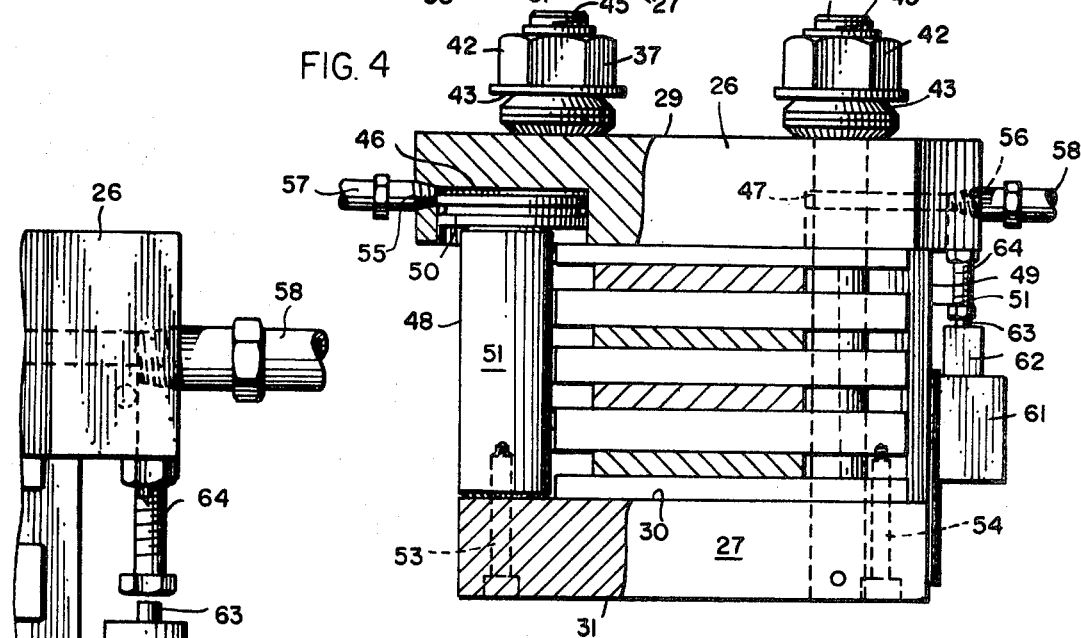

INVENTORS:
EDWIN A. SPANKE
VINCENT J. BALUNAS, JR.

SPRING APPLIED, FLUID PRESSURE RELEASED LOCKING DEVICE

BACKGROUND OF THE INVENTION

The present invention relates to locking devices, and, more particularly, to locking devices which are particularly well adapted for use as a safety lock to prevent accidental movement of a member such as the slide of a metal-working press, or the like.

It is a primary object of the present invention to afford a novel locking device for holding a member, such as the slide of a press, or the like, from accidental movement.

Locking devices for holding members, such as press slides, brakes, jacks, and the like, against accidental movement have been heretofore known in the art. In many instances, they have constituted safety devices used as auxiliary units in addition to the normal supporting mechanisms intended to hold such members against movement. Such locking devices as have been heretofore known in the art have had several inherent disadvantages, such as, for example, requiring that the member to be held be disposed in a particular, predetermined position; being difficult to construct; being unreliable in operation; embodying abutment members which are readily subject to breakage by shear stresses applied thereto; being complicated in construction and operation; or being difficult and expensive to manufacture, and the like. It is an important object of the present invention to overcome such disadvantages.

Another object of the present invention is to afford a novel locking device effective to hold a member at any desired position along the path of movement of the member.

Another object is to afford a novel locking device for supporting a member, which may be readily adjusted to afford the desired magnitude of the holding or supporting force.

Yet another object of the present invention is to afford a novel locking device of the aforementioned type which is reliable in its holding or supporting operation.

A further object is to afford a novel locking device of the aforementioned type which may be quickly and easily released from holding or supporting operation, to thereby permit the movement of a member being held or supported thereby.

Another object of the present invention is to afford a novel locking device embodying a novel signal device for affording a warning if the parts of the locking device become worn to a point where additional wear might render the locking device unreliable in operation.

Another object is to afford a novel locking device for insuring that a member will not be accidentally moved relative to another member, which is practical and efficient in operation and which may be readily and economically produced commercially.

Other and further objects of the present invention will be apparent from the following description and claims and are illustrated in the accompanying drawings which, by way of illustration, show preferred embodiments of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention and the purview of the appended claims.

DESCRIPTION OF THE DRAWINGS

In the drawings:

FIG. 1 is a fragmentary side elevational view of a locking device embodying the principles of the present invention, showing, somewhat diagrammatically, the device mounted in a press;

FIG. 2 is a fragmentary side elevational view of the locking device shown in FIG. 1 looking in the direction of the arrows 2—2 in FIG. 1, and with certain parts broken away to show underlying parts.

FIG. 3 is a sectional view taken substantially along the line 3—3 in FIG. 2, with certain parts broken away to show underlying parts;

FIG. 4 is a sectional view similar to FIG. 3, but showing parts disposed in a different operative position;

FIG. 5 is an enlarged, fragmentary view of a portion of the locking device shown in FIG. 3;

DESCRIPTION OF THE EMBODIMENT SHOWN HEREIN

Figure 7:
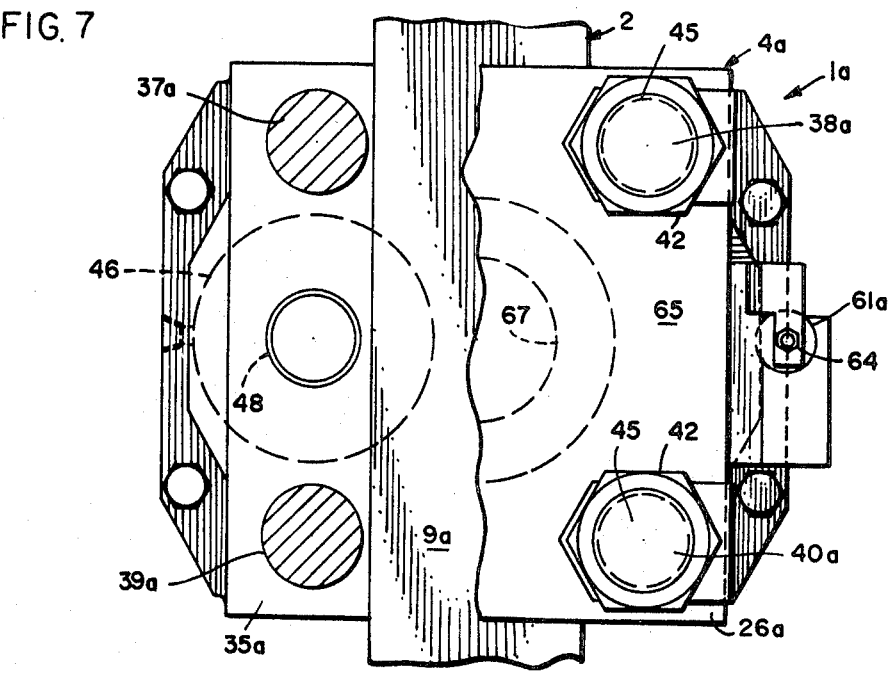
FIG. 7 is a view taken substantially along the line 7—7 in FIG. 6.

A locking device 1, embodying the principles of the present invention is shown in FIGS. 1 to 5, of the drawings, to illustrate the presently preferred embodiment of the present invention. In general, the locking device 1 embodies an elongated supporting unit 2 which may be mounted on a supporting structure such as, for example, the supporting frame 3 of a metal-working press, or the like, in depending relation thereto and a holding unit 4 slidably mounted on the supporting unit 2 and adapted to be attached to a member to be supported, such as, for example, a slide 5 in such a press, the holding unit 4 being operable to be clamped and unclamped relative to the supporting unit 2 to thereby hold the slide 5, or the like, against movement longitudinally of the supporting unit 2 and to release the slide 5, or the like, for movement longitudinally of the supporting unit 2, respectively.

It will be appreciated by those skilled in the art that although the locking device 1 is shown herein as being embodied in a press, to afford a locking device for preventing accidental movement of the slide of the press, this is merely by way of illustration and not by way of limitation, and the locking device may be embodied in other types of mechanisms, such as, for example, in jacks, brakes, and the like, without departing from the purview of the present invention.

The supporting unit 2 shown in the drawings embodies four elongated supporting members or bars 6, 7, 8 and 9 disposed in spaced, substantially parallel relation to each other, FIG. 1. The bars 6–9 are substantially rectangular in transverse cross-section, FIG. 3, and each embodies two broad side faces 10 and 11 disposed in substantially parallel relation to each other, and two narrower side faces 12 and 13 disposed in substantially perpendicular relation to the faces 10 and 11 and in substantially parallel relation to each other. In the supporting unit 2, the bars 6–9 are disposed in side-by-side relation to each other, with the side faces 10 and 11 of the adjacent bars being disposed in substantially parallel relation to each other.

The upper ends 14 of the bars 6–9 are mounted in a supporting bracket 15, FIGS. 1 and 2, and secured thereto by suitable means such as welding W. The supporting bracket embodies five cross bars 16, 17, 18, 19 and 20, FIG. 1, secured together by a rod or pin 21 which extends therethrough and through the upper ends 14 of the bars 6–9, which are disposed between respective adjacent pairs of the cross bars 16–20.

The lower ends 22 of the bars 6–9 are slidably mounted on a rod or pin 23, which extends therethrough, for movement toward and away from each other, for a purpose which will be discussed in greater detail presently. Outward movement of the outermost bars 6 and 9 on the rod 23 preferably is limited by suitable means such as pins 24 and 25 extending through the ends of the rod 23 outwardly of the bars 6 and 9, respectively.

The holding unit 4 embodies two substantially flat pressure plates 26 and 27, FIGS. 1–3, disposed in substantially parallel relation to each other on opposite sides of the bars 6–9. The plate 26 has an inner face 28 and an outer face 29 and is disposed outwardly of the bar 6 with the inner face 28 disposed in substantially parallel facing relation to the face 11 of the bar 6. The plate 27 has an inner face 30 and an outer face 31 and is disposed outwardly of the bar 9 with the inner face 30 disposed in substantially parallel facing relation to the face 10 of the bar 9.

Five substantially flat friction plates 32, 33, 34, 35 and 36 are disposed in spaced lateral relation to each other between the pressure plates 26 and 27, FIG. 1. The friction plates 32–36 are disposed in substantially parallel relation to the pressure plates 26 and 27, with the friction plate 32 disposed between the pressure plate 26 and the bar 6; the friction plate 33 disposed between the bars 6 and 7; the friction plate 34 disposed between the bars 7 and 8; the friction plate 35 disposed between the bars 8 and 9; and the friction plate 36 disposed between the pressure plate 27 and the bar 9.

Four compression rods 37, 38, 39 and 40, FIG. 2, each comprising a bolt 41, a nut 42 and a dished washer 43, are mounted in respective four corners of the plates 26, 27 and 32–36, with one end of each of the bolts 41 secured to the pressure plate 27 by threaded engagement in tapped openings 44 therein, FIG. 1, and with the bolts 41 extending through the plates 26 and 32–36 and having a threaded end portion 45 projecting outwardly from the pressure plate 26. The two compression rods 37 and 39 are disposed outwardly of the bars 6–9 adjacent to the faces 12 thereof, and the other two compression rods 38 and 40 are disposed outwardly of the bars 6–9 adjacent to the faces 13 thereof, FIG. 2.

The nuts 42 are disposed on the threaded ends 45 of the bolts 41 and are operable to clamp the dished washers 43 on the respective bolts 41 against the outer face 29 of the pressure plate 26 to thereby yieldingly urge the pressure plates 26 and 27 toward each other, and thereby clamp the supporting unit 2 and the friction plates 32–36 therebetween. By adjusting the position of the nuts 42 on the bolts 41, the magnitude of the yielding clamping force exerted through the dished washers 43 on the pressure plates 26 and 27 may be effectively adjusted for selectively determining the force with which the holding unit 4 is held against movement longitudinally of the supporting unit 2 by reason of the frictional engagement of the plates 26, 27 and 32–36 with the bars 6–9.

During adjustment of the nuts 41, inward movement of the pressure plates 26 and 27 relative to each other, caused by the movement of the nuts 42 toward the pressure plate 27, is effective to press the friction plates 32 and 36 into engagement with the outer faces 11 and 10 of the bars 6 and 9, respectively, the lateral pressure applied to the bars 6 and 9 being effective to deflect them inwardly toward each other to thereby similarly clamp the friction plates 33–35 and the bars 7 and 8 therebetween, with the bars 7 and 8 deflecting inwardly toward each other so that each of the friction plates 32–36 is disposed in frictional engagement with the respective adjacent ones of the bars 6–9. As will be appreciated by those skilled in the art, the extent of the inward adjustment of the nuts 41 determines the magnitude of the frictional supporting force between the plates 32–36 and the bars 6–9.

The pressure plate 26 has two cylinders 46 and 47 formed in the inner face 28 thereof midway between the compression rods 37 and 39 and the compression rods 38 and 40, respectively. Two elongated pistons 48 and 49, FIG. 3, are disposed in the cylinders 46 and 47, the pistons 48 and 49 each having an enlarged head 50 disposed in the respective cylinders 46 and 47, and an elongated piston rod 51 extending from the respective cylinders 46 and 47 into abutting engagement with the inner face 30 of the pressure plate 27. Openings in the form of recesses or notches 52, FIG. 2, are formed in the opposite edge portions of each of the friction plates 32–36, outwardly of the side edges 12 and 13, respectively, of the bars 6–9, and the piston rods 51 of the respective pistons 48 and 49 extend therethrough with a freely slidable fit. The pistons 48 and 49 are secured to the pressure plate 27 in abutting engagement with the inner face 30 thereof by bolts 53 and 54 extending through the pressure plate 27 and threaded into the rods 51 of the pistons 48 and 49, respectively, FIG. 3.

The cylinders 46 and 47, formed in the inner face 28 of the pressure plate 26 terminate at their inner end in inwardly spaced relation to the outer face 29 of the pressure plate 26, FIGS. 3 and 4. Inlet openings 55 and 56 extend through the side walls of the pressure plate 26 into the inner ends of the cylinders 46 and 47, respectively, and conduits in the form of pipes or tubes 57 and 58 are connected into the openings 55 and 56 for a purpose which will be discussed in greater detail presently.

The bars 6–9 and the pressure plates 26 and 27 may be made of any suitable material such as steel. Likewise, if desired, the friction plates 32–36 may be made of steel. However, we prefer to make the friction plates 32–36 out of suitable material having a higher coefficient of friction, such as, for example cast iron or cast bronze.

In the operation of the locking device 1, it may be mounted on the supporting structure of a suitable unit or machine, such as, for example, the supporting frame 3 of a press in such position that the bars 6–9 extend the length of, and in parallel relation to the path of travel of the member, such as, for example, the slide 5, intended to be held by the locking device 1 when the holding unit 4 is disposed in clamping relation to the supporting unit 2. To accomplish this, the mounting bracket 15 may be secured by suitable means, such as bolts 59 to the supporting structure 3 in position to support the supporting unit 2 in the desired relation to the aforementioned path of travel. In the drawings, the bracket 15 is shown mounted on the upper face of the top wall of the supporting frame 3, with the bars 6-9 extending downwardly through the supporting frame 3. With this arrangement, the openings in the supporting frame 3 through which the bars 6-9 extend preferably are sufficiently greater in cross-section than the transverse cross-section of the bars 6-9 to permit the aforementioned lateral deflection of the bars 6-9 in the positions of the holding unit 4 along the path of travel of the slide 5. However, as will be appreciated by those skilled in the art, if desired, the supporting bracket 15 may be otherwise secured to the supporting frame 3, such as, for example, being secured to the lower face of the top wall thereof.

In mounting the locking device 1 in operative position, the supporting unit 2, with the holding unit 4 loosely mounted thereon, may be disposed in such position relative to the aforementioned path of travel of the member to be supported, such as the slide 5, that the pressure plate 27 of the holding unit 4 may be secured to the slide 5 by suitable means, such as welding 60, FIG. 1. The nuts 42 may then be adjusted on the bolts 41 into position to press the washers 43 against the outer face 29 of the pressure plate 26 with the force necessary to afford the desired frictional engagement of the holding unit 4 with the supporting unit 2. The tubes 57 and 58 may then be connected through a suitable valve, not shown, to a suitable source of working fluid, not shown, such as, for example, a source of compressed air or a pump for feeding hydraulic fluid, hydraulic fluid being the presently preferred form of working fluid for use in the locking device 1.

With the locking device 1 thus ready for operation, when it is desired to hold the slide 5 in adjusted position, the cylinders 46 and 47 may be vented to atmosphere through the pipes 57 and 58, the holding unit 4 then being disposed in the aforementioned clamping engagement with the supporting unit 2 effective to hold the holding unit 4, and, therefore, the slide 5 against movement longitudinally of the supporting unit 2. When it is desired to move the slide 5 along its normal path of movement, working fluid may be fed through the tubes 57 and 58 into the cylinders 46 and 47 to thereby move the pistons 48 and 49 outwardly from the cylinders 46 and 47. This movement of the pistons 48 and 49 is effective to force the pressure plates 26 and 27 outwardly away from each other, against the urging of the compression rods 37-40, to thereby free the friction plates 32-36 from their clamping engagement with the bars 6-9 of the supporting unit 2, thus freeing the holding unit 4 and the slide 5 for movement longitudinally of the supporting unit 2. If at any position along the path of travel of the slide 5 it is desired to stop the same, the cylinders 46 and 47 may again be vented to atmosphere through the tubes 57 and 58 to thereby again dispose the holding unit 4 in the aforementioned clamp relation to the supporting unit 2 and effectively hold the slide 5 against movement longitudinally of the supporting unit 2.

A signal device 61, FIGS. 1-5, is mounted between the pressure plates 26 and 27 to afford a warning signal in the event that the wear on the friction plates 32-36 or on the bars 6-9 should become of sufficient magnitude as to render unreliable the frictional engagement of the holding unit 4 with the supporting unit 2. The signal device 61 includes a switch 62, which may be of any suitable type readily available on the market. The switch 62 embodies an actuator mechanism, including a button 63, for opening and closing the same, and is mounted on a peripheral outer edge portion of the pressure plate 27 in such position that the button 63 faces toward the pressure plate 26, FIGS. 3-5.

An abutment member in the form of bolt 64 is threaded into the pressure plate 26 in longitudinal alignment with the button 63, and may be adjusted into position in the pressure plate 26 wherein it is disposed in spaced relation to the button 63 in all operative positions of the pressure plates 26 and 27 relative to each other, when the friction plates 32-36 and the bars 6-9 are of such thickness as to insure effective operation of the holding unit 4 relative to the supporting unit 2, when it is desired to hold the slide 5 against movement longitudinally of the supporting member 2; but the abutment member 64 will engage and depress the button 63 to thereby close the switch 62 if the friction plates 32-36 or the bars 6-9 should become sufficiently worn that any substantial additional wearing thereof would jeopardize the effective clamping engagement of the holding unit 4 with the supporting unit 2. The switch 62 may be connected to any suitable source of electric power, not shown, and may be operatively connected to any suitable signal unit, such as, for example, a buzzer or signal lamp, not shown, so that it is effective to afford an audible or visible signal, respectively, in the event that the abutment member 64 operatively engages the push button 63 during operation of the locking device 1.

Figure 6:
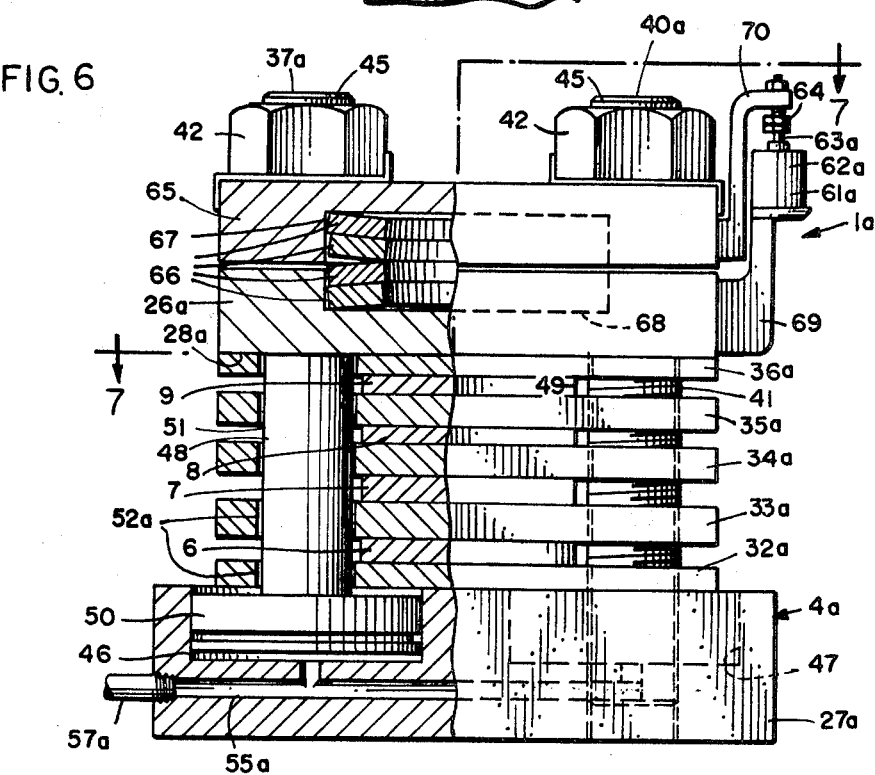
FIG. 6 is a view similar to FIG. 3, but showing a modified form of the present invention.

A locking device 1a, which constitutes a modified form of the present invention, is shown in FIGS. 6 and 7, with parts which are the same as parts shown in FIGS. 1-5 indicated by the same reference numeral, and with parts which are similar to, but which have been substituted for parts shown in FIGS. 1-5 being shown by the same reference numeral with the suffix "a" added thereto.

Like the locking device 1, the locking device 1a embodies a holding unit 4a mounted on a supporting unit 2, which embodies four spaced elongated bars 6-9. However, the construction of the holding unit 4a is somewhat different from that of the holding unit 4 shown in FIGS. 1-5.

Thus, for example, in the holding unit 4a, the cylinders 46 and 47 are formed in the pressure plate 27a, FIG. 6, and the pistons 48 and 49 are disposed in abutting engagement with the inner face 28a of the pressure plate 26a, which is the reverse of the arrangement of parts in the holding unit 4, FIGS. 3 and 4. Also, the piston rods 51 in the holding unit 4a extend through circular openings 52a in the edge portions of the friction plates 32a-36a rather than recesses, such as the recesses 52, as in the edge portions of the friction plates 32-36. Further, the cylinders 46 and 47 are connected through a common passageway 55a to a common pipe or tube 57a, rather than through individual passageways 55 and 56 to individual tubes 57 and 58, as in the locking device 1.

In addition, the compression rods 37a-40a of the locking device 1a do not embody dished washers, but, instead, a pressure plate 65 is disposed outwardly of the pressure plate 26a, in in parallel relation thereto, between the nuts 42 and the pressure plate 26a, with a plurality of disc springs 66 disposed in recesses 67 and 68 in the central portions of the adjacent faces of the pressure plate 65 and the pressure plate 26a, respectively, in position to yieldingly urge the pressure plates 65 and 26a away from each other.

In the operation of the locking device 1a, the nuts 42 may be adjusted on the bolts 41 of the compression rods 37a–40a into position to press the pressure plate 65 and the disc washers 66 against the pressure plate 26a with the force necessary to afford the desired clamping force for holding the holding unit 4a stationary on the supporting unit 2, the disc springs 66 affording a yieldable force between the pressure plates 65 and 26a for this purpose. Also, in the operation of the locking device 1a, when it is desired to release the holding unit 4a from clamping relation to the supporting unit 2, working fluid may be fed through the tube 57a and the passageway 55a into both of the cylinders 46 and 47 to thereby urge the pistons 48 and 49 outwardly from the cylinders 46 and 47 and move the pressure plate 26a toward the nuts 42 against the urging of the disc springs 66, and thus free the holding unit 4a from its clamping engagement with the supporting unit 2.

A signal device 61a is embodied in the holding unit 4a, which, like the signal device 61 in the holding unit 4, is operable to signal excessive wear of the friction plates 32a–36a and of the bars 6–9. The signal device 61a includes a switch 62a embodying an actuating mechanism which includes a push button 63a. In this instance, the push button 63a is effective to close the switch 62a when it is in fully extended position.

The switch 62a is mounted on a bracket 69, which is mounted on the peripheral edge of one side of the pressure plate 26a, FIG. 6. An abutment member 64 is mounted on a bracket 70, which is mounted on the peripheral edge of one side of the pressure plate 65. The abutment member 64 is disposed in longitudinal alignment with the push button 63a, and is normally effective to hold the push button 63a in depressed position so as to maintain the switch 62a in open condition.

The abutment member 64 is longitudinally adjustable in the bracket 70 and, during assembly of the holding unit 4a, is adjusted into such position that it will hold the push button 63a in such depressed position during all normal operations of the locking device 1a; and, if the friction plates 32a–36a or the bars 6–9 become sufficiently worn that effective clamping engagement of the holding unit 4a with the supporting unit 2 would be endangered by additional wear thereof, the consequent separation of the pressure plate 26a from the pressure plate 65 by the disc springs 66 is effective to separate the abutment member 64 and the push button 63a sufficiently that the switch 62a is permitted to close. As previously discussed with respect to the signal device 61, the switch 62a may be operatively connected to either an audible or visual signal unit, not shown, to thereby afford an audible or visible warning signal, respectively, when the switch 62a is closed.

From the foregoing it will be seen that the present invention affords a novel locking device which provides an effective safety lock for use in units or machines, such as presses, jacks, brakes, and the like, for insuring that in the operation of such a unit one part will not accidentally move relative to another part.

Also it will be seen that the present invention affords such a novel locking device which is readily operable and which may be quickly and easily adjusted.

In addition, it will be seen that the present invention affords a novel locking device of the aforementioned type which is practical and efficient in operation and which may be readily and economically produced commercially.

Thus, while we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A locking device for holding an article against movement and comprising
    a. a plurality of elongated, laterally spaced supporting members disposed in side-by-side relation to each other,
    b. a plurality of laterally spaced plates disposed in side-by-side relation to each other,
    c. pairs of adjacent ones of said plates being disposed on opposite sides of a respective one of said supporting members,
    d. the two outermost of said plates being disposed on opposite sides of said plurality of supporting members,
    e. one of said outermost plates being adapted to be operatively connected to such an article,
    f. yieldable compression means operatively connected to said plates in position to yieldingly urge said two outermost plates together and thereby yieldingly urge said plurality of supporting members toward each other and urge said plurality of plates toward each other to thereby dispose said plurality of plates in clamping engagement with said plurality of supporting members effective to hold said plurality of plates and such an article so operatively connected to said one outermost plate against movement longitudinally of said supporting members,
    g. one of said outermost plates having two spaced cylinders therein,
    h. two elongated pistons disposed on opposite sides of said supporting members,
    i. one end of each of said pistons being disposed in respective ones of said cylinders,
    j. the other end of each of said pistons being operatively connected to the other of said outermost plates, and
    k. means for feeding working fluid into said cylinders in position for forcing said pistons outwardly therefrom and thereby moving said two plates apart against the urging of said compression means to thereby free said plurality of plates and such an article so connected to one outermost plate for movement longitudinally of said plurality of supporting members.

2. A loading device as defined in claim 1, and in which
    a. said compression means comprises
        1. elongated compression rods extending between said two plates on opposite sides of said supporting members in position to clamp said two plates together, and
        2. resilient means disposed around respective ones of said rods between one end of said rods and one of said two plates in position to yieldingly transmit the clamping force of said rods to said two plates.

3. A locking device as defined in claim 2, and in which
a. said resilient means comprise spring washers.
4. A locking device as defined in claim 1, and in which
a. said compression means comprises
1. elongated compression rods extending between said two plates on opposite sides of said supporting members in position to clamp said two plates together,
2. an additional plate disposed outwardly of one of said two plates, and
3. resilient means disposed between said additional and last mentioned one plate.
5. A locking device as defined in claim 4, and in which
a. said resilient means comprise spring washers.
6. A locking device as defined in claim 5, and
a. which includes signal means for indicating when said plates have a thickness of less than a predetermined amount, and
b. in which
1. said signal means includes a switch having
a. an actuating mechanism, and
b. supporting means for said actuating mechanism,
2. said supporting means in mounted on one of said two plates in position to dispose said actuating mechanism in position wherein
a. it is disposed in spaced relation to the other of said two plates when said plurality of plates are disposed in said clamping engagement with said supporting members and said thickness is greater than said predetermined amount, and
b. it is disposed in position to be engaged and actuated by the other of said two plates when said plurality of plates are disposed in said clamping engagement with said supporting member and said thickness is less than said predetermined amount.

* * * * *